United States Patent Office 3,233,105
Patented Feb. 1, 1966

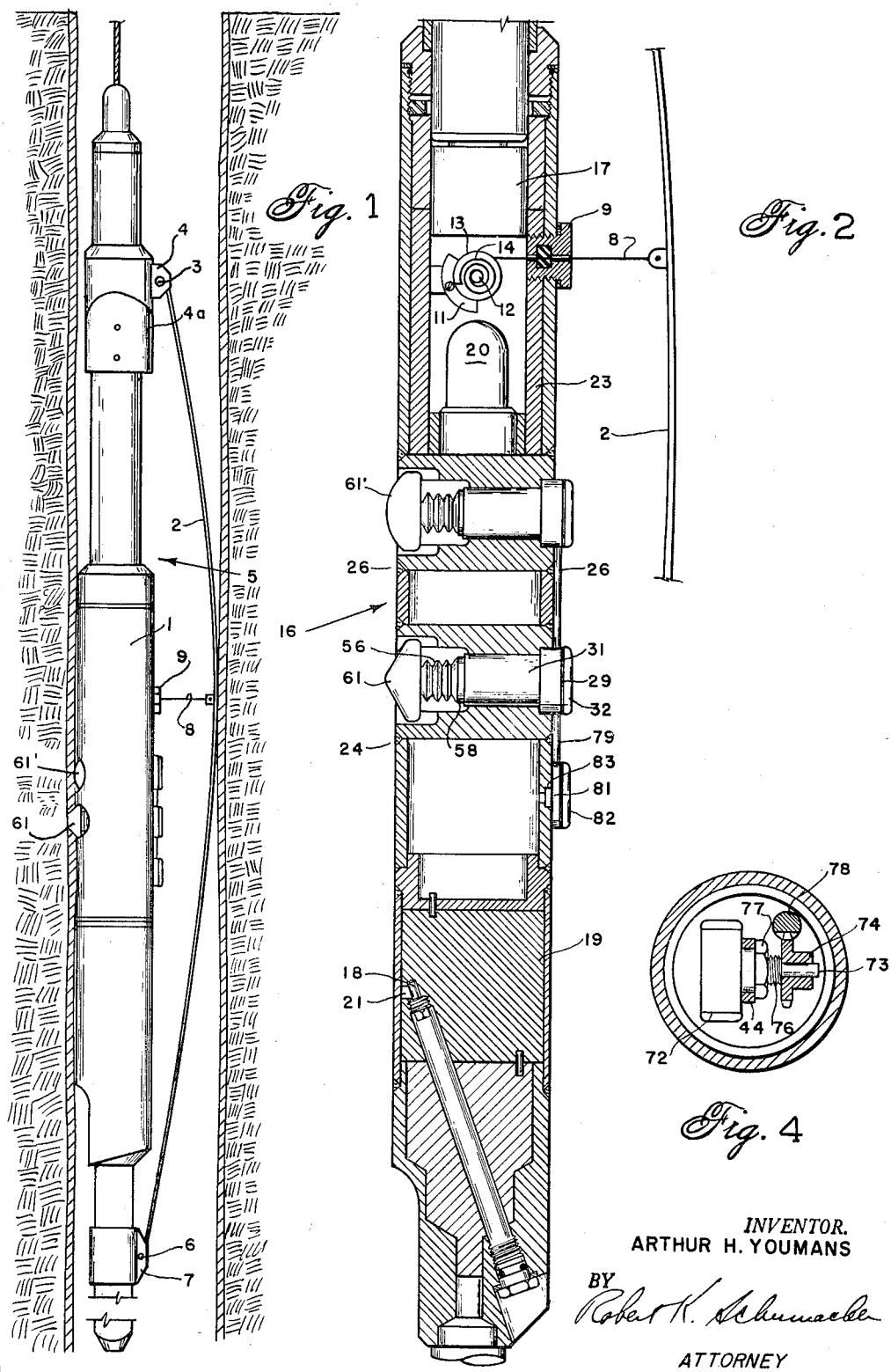

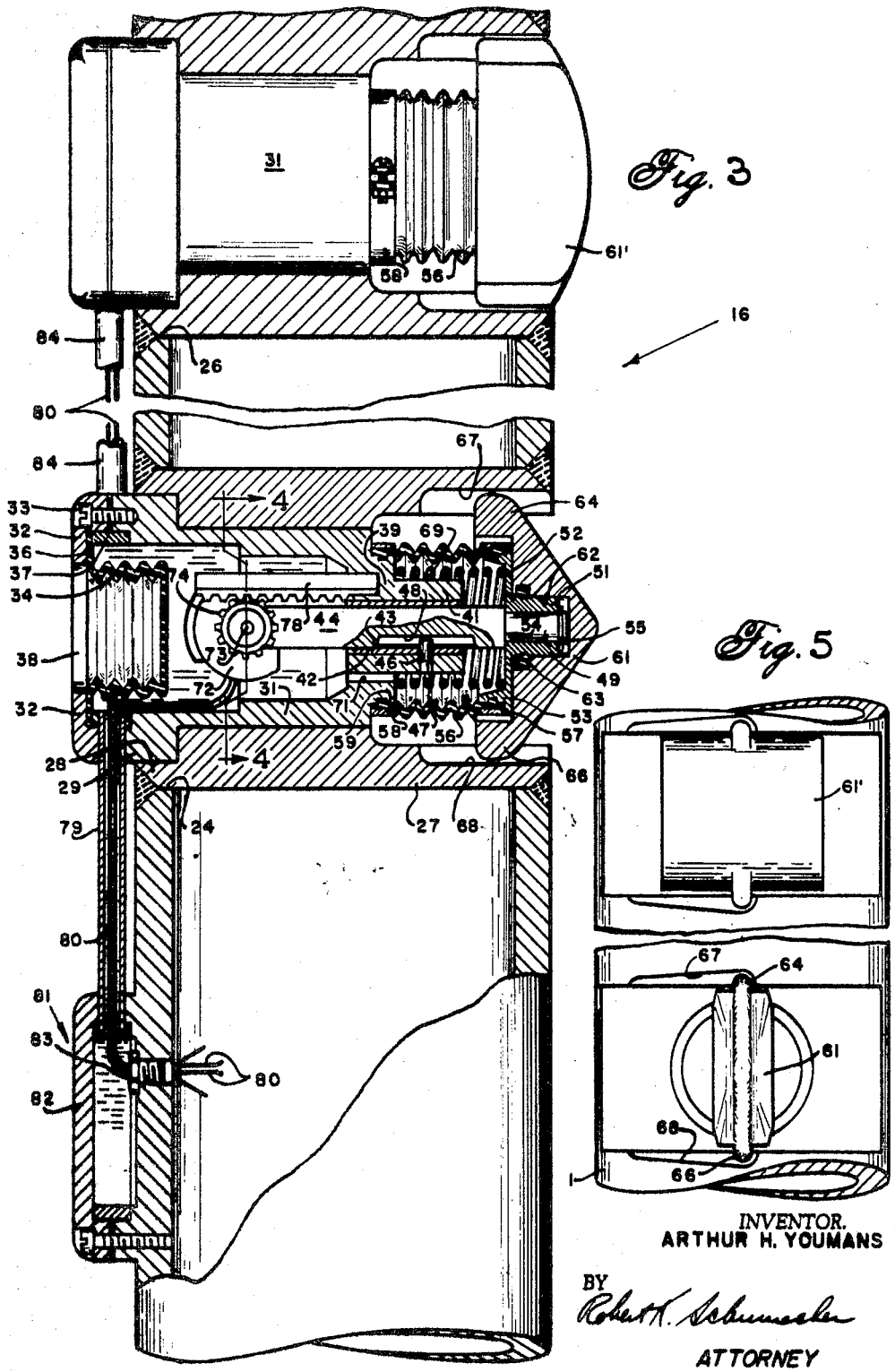

3,233,105
MEASUREMENT OF STAND-OFF OF A DE-
CENTRALIZED NUCLEAR WELL LOGGING
INSTRUMENT
Arthur H. Youmans, Tulsa, Okla., assignor, by mesne
assignments, to Dresser Industries, Inc., Dallas, Tex., a
corporation of Delaware
Filed Sept. 17, 1959, Ser. No. 840,569
6 Claims. (Cl. 250—83.3)

The present invention relates to well logging tools and more particularly to a decentralized well logging tool for accurately determining by nuclear measurement techniques physical and atomic properties of the materials forming the various strata intersected by a well and for measuring the diameter of the well if such is desired.

The trained observer can obtain much information relative to the probability of oil being located in a particular location from an investigation of the properties and locations of various strata intersected by a well. Conventionally, tests are made for determining the physical and atomic properties of the materials intersected by the well and the diameter of the well. From a measurement of the diameter of a well, the trained observer can determine several important facts concerning the nature of the subsurface formations. Specifically, during the well drilling operations, the movement of the drilling mud around the drilling tool abrades the surrounding material and the well is enlarged by the abrading action to an extent indicative of the brittleness of the material. Therefore, the relative diameters of different sections of the well are indicative of the relative brittleness of various strata and further abrupt changes in well diameter indicate an interface between strata. In consequence, measurement of the diameter of the well provides an indication both as to brittleness of the formations and the delineation between strata.

Measurement of the density and atomic properties of the formations may be effected by numerous known methods; and in various known systems natural or induced nuclear radiations may be employed. In one such nuclear well lodging system gamma rays are directed at the surface of the well adjacent the tool, and the back-scattered emanations are caused to impinge upon a radiation detector sensitive to gamma rays. The concept of measurement of density of material by measurement of back-scattered gamma rays and the measurement of other physical and atomic properties by nuclear measurement techniques are well known in the art and in such systems, the number and energy of rays intercepted by a radiation detector are indicative of a specific property of the material subsisting immediately adjacent the well tool. Variable parameters may be introduced into the measurements made by nuclear energy measuring systems due to the fact that the well tool is not always in engagement with the surface of the well wall but may be riding a mud cake or may be completely out of contact with both the well wall and the mud cake due to unevenness of the well wall. It is important to determine the existence of the above conditions and to take their effects into account when interpreting a well log obtained by nuclear measurement techniques. For example, if the density of the mud cake is a known factor and if the thickness of the mud cake is measured, the readings obtained from the scattered gamma ray measuring system may be corrected to produce a true indication of the density of the material under investigation. A further advantage which may be obtained from the utilization of an apparatus for measuring the thickness of a mud cake is that the thickness of the mud cake is a function of the permeability of the strata, and therefore its measurement not only may be employed to correct the density reading obtained but also may be employed to provide further information relative to the structure of the strata. An additional feature of such a measurement is that a true reading of the diameter of the well may be obtained by adding a factor related to twice the mud cake thickness measurement to the reading obtained from the calipering portion of the tool. Still further, in order to provide an indication of the thickness of the mud cake a tool must be provided which pierces the cake and contacts a wall of the well over a very small area. In consequence, the reading obtained directly from the tool which pierces the mud cake provides a ready indication of the roughness of and discontinuities in the well wall which is of further interest to the trained observer.

It is therefore an object of the present invention to provide in combination with a well tool employing radiation detection equipment for measuring the density or other physical and molecular properties of the strata encountered, a mechanism for measuring the separation of the well tool from the well wall so as to permit interpretation or correction of nuclear energy measurements obtained.

It is another object of the present invention to provide an apparatus for measuring the density, porosity, brittleness, and extent of the various strata through which a well bore passes by adding to a conventional well tool for performing calipering and density measurements, a mud cake thickness detector.

It is still another object of the present invention to provide a well logging tool with a mud cake thickness detector which, in combination with a conventional calipering mechanism and a conventional density measuring mechanism, provides well logs which may be interpreted to indicate the density, porosity, brittleness, roughness of the surface of and extent of the strata intercepted by a well bore.

In accordance with the present invention, the conventional decentralized well tool employed in nuclear well logging systems, is provided with mechanisms for measuring the separation of the well tool from the well wall and for measuring the mud cake thickness. The mud cake thickness detector comprises a pair of "shoes" mounted in the well tool for movement generally perpendicular to the longitudinal axis of the tool. The shoes are closely spaced relative to one another along the longitudinal axis of the tool which is biased into engagement with the well wall by suitable decentralizing means. If the tool also carries a calipering tool, a bow spring caliper may be employed for the decentralizing means. One of the shoes employed in the mud cake measuring apparatus has a large flat surface, so that it rides the outer surface of the mud cake while the other shoe has a sharp surface which penetrates the mud cake and extends into contact with the well wall. Both shoes are disposed along the intended line of contact of the tool and the well wall. Potentiometers are employed to convert the positions of the two shoes relative to the well tool into electrical signals and these signals may be correlated to obtain an indication of the thickness of the mud cake. The separation detector comprises the flat-faced shoe and its associated potentiometer since when the well tool is out of contact with both the well wall and the mud cake, the flat-faced shoe extends outwardly from the tool by a distance equal to the separation at that point or extends outwardly by a maximum distance indicating a gross separation of tool and wall. The mud cake detector is located between the radiation source and radiation detector, so that the separation detector determines separation of tool and wall, within limits, and the mud cake detector generally measures the thickness of the cake through which the gamma rays pass. Therefore, the density measurement may be interpreted in the light of or corrected by reference to the tool separation and/or the thickness of the mud cake. Further, if a calipering tool is employed in conjunction with th aforesaid well tool, the reading indicative of the extension of the mud piercing shoe of the mud cake detector when additively combined with the reading obtained from the caliper which rides on the surface of the mud cake, provides an indication of the true diameter of the well. Further, the variations in movement of the sharp shoe which has a relatively small area of contact with the wall of the well provides a ready indication of the roughness of this surface which in conjunction with the other logs provides further useful information concerning physical properties.

The above and still further features, advantages and objects of the present invention will become apparent upon consideration of the following detailed description of one specific embodiment thereof, especially when taken in conjunction with the accompanying drawings, wherein:

FIGURE 1 is a view in elevation of the well tool of the invention;

FIGURE 2 is a cross sectional view in elevation of the well tool of the present invention;

FIGURE 3 is a cross sectional view in elevation of a portion of the well tool illustrated in FIGURE 1;

FIGURE 4 is a partial view taken along section 4—4 of FIGURE 3; and

FIGURE 5 is a top view of the mud cake detector shoes.

Referring specifically to FIGURES 1 and 2 of the accompanying drawings, there is illustrated a well tool 1 having a bow spring caliper 2 for maintaining the lower surface of the tool 1 as illustrated in FIGURE 1 against the wall of a well 5 in which the tool is disposed. The bow spring caliper 2 is pivotally secured at 3 to a sleeve 4 slidable along the well tool 1. The other end of the bow spring 2 is pivotally secured at 6 to a second sleeve 7 slidable along the well tool 1 and therefore as the tool moves upwardly in the well and the diameter of the well 5 varies, the sleeve 4 is stopped by stop 4a and the sleeve 7 slides along the well tool casing to permit contraction and expansion of the bow spring 2 with variations in the diameter of the well.

A wire 8, like piano wire, is secured to the bow spring 2 adjacent the center thereof and extends through the wall of the well tool 1 into the interior thereof. A packing member 9 is threaded into the wall of the well tool in order to provide a seal about the wire 8. A potentiometer 11 is disposed within the tool 1 and has its casing secured to the well tool. The wire 8 is wound about a drum 13 to which center shaft 12 of the potentiometer 11 is secured. The drum 13 is biased by a spiral spring 14 to maintain a force on the wire 8 so that as the wire moves with movement of the bow spring 2, the shaft 12 of the potentiometer is rotated with respect to the casing of the potentiometer. In consequence, a wiper which is normally secured to the shaft 12 is rotated with respect to the resistive element of the potentiometer 11, and produces a variation in resistance, between the wiper and one end of the resistive element, which varies as a function of the movement of the bow spring and therefore as a function of the diameter of the well. The particular arrangement for mounting the bow spring caliper and measuring its movement is exemplary only, and it is not intended to limit the scope of the invention to the details illustrated, since other conventional techniques may be readily employed.

The well tool 1 is divided into several sections in which the various components of the apparatus are disposed. More particularly, the apparatus for measuring the well tool and well wall separation, the thickness of the mud cake, and an indication of the roughness of the wall, is housed within a compartment 16, whereas the electronic circuitry which converts the measurements performed by the various sensing devices of the apparatus into electrical signals suitable for transmission to a surface station, is located in a compartment 17. A source 18 of radioactive material is disposed within a solid body of shielding material 19 having a window 21 which permits radioactive emanations to impinge upon the material forming the sides of the well in which the tool is located. A radioactive detector 20 is disposed in a compartment 23 and is spaced from the source 18 by such a distance that gamma rays back-scattered from the material being measured may impinge thereupon. The radiation source and radiation detector are completely conventional as are the electronic circuits disposed within the compartment 17 which constitute amplifiers, discriminators, and telemetering means permitting the transmission of the various units of information to a surface station.

It will be noted that the apparatus for measuring tool to wall separation and mud cake thickness is disposed between the radiation source 18 and the detector 20 and therefore measures there parameters in the same region in which the density measurements are made. Therefore, the density measurements may be interpreted or corrected in accordance with the facts indicated by the separation and thickness indications. The apparatus for measuring the wall and tool separation, the thickness of the mud cake and the roughness of wall is illustrated in detail in FIGURE 3 of the accompanying drawings. Referring now specifically to this figure, the compartment 16 has two transverse apertures 24 and 26 extending completely through the well tool. The measuring apparatus disposed in both of the transverse apertures 24 and 26 are identical except for the shape of the surface contacting tools, and therefore the ensuing description refers only to the mechanism disposed within the aperture 24, this description being equally applicable to the members disposed within the aperture 26 except for the shape of the projecting shoes.

A cylindrical sleeve 27 is disposed within the aperture 24 and is secured as by welding to the cylindrical wall of the casing. The left end of the sleeve 27 as viewed in FIGURE 3, has a section 28 of enlarged inner diameter which receives an enlarged head portion 29 of a hollow cylindrical body 31 disposed within the hollow sleeve 27. The enlarged head portion 29 of the cylindrical body 31 is open and is provided with a cap 32 which may be secured to the portion 29 by a suitable means such as by bolts 33. A flexible bellows 34 extends partly into the opening in the body 31 particularly in the region of the enlarged head portion 29 and has a flared end 36 clamped between the inner surface of the cap 32 and a circular seal 37 disposed within mating recesses in the inner circumference of the head potrion 29 and the cap 32. The cap 32 is centrally apertured at 38 so that the bellows is subjected to the pressure within the well but prevents the well muds or fluids from entering the interior of the hollow cylindrical member 31. The member 31 terminates at its right end in an end wall 39 having a straight flat left surface extending generally parallel to the inner portion of the bellows 34. The end wall 39 has a cylindrical hub 41 extending outwardly therefrom to the right as viewed in FIGURE 3, and further has an axially extending aperture 42 which is coaxial with the aperture 24. A thin sleeve bearing 43 is disposed in the aperture 42 and is adapted to support a shaft 44 for reciprocating motion therein. A pin 46 is fastened in a transverse aperture in the hub 41 and extends into a keyway 48 in the shaft 44 so as to permit reciprocating motion of the shaft 44 while preventing rotary motion thereof. The right end 49 of the shaft 44 is of reduced diameter and extends through a hub 51 projecting to the right from a plate 52 having a circumferential circular flange 53 extending to the left therefrom. The plate 52 is clamped between a shoulder 54, formed on the shaft 44 by the reduction in diameter of the portion 49 thereof, and a snap ring 55 which engages the end portion 49 of shaft 44 to the right of the hub 51. A bellows 56 is secured to the outer periphery of flange 53 by a circular ring 57 which may be retained in position as by bolting or force fitting or other suitable means. The left end of the bellows 56 is clamped between another ring 58 and a circumferential shoulder 59 formed at the right end of the cylindrical body 31 adjacent the region from which the hub 41 extends.

A shoe 61 having a sharp edge directed against the well wall, has a central cylindrical recess 62 formed in its left face and the recess 62 is adapted to receive the hub 51 of the plate 52. A force fit may be provided between these two members and a sealing ring 63 is employed therebetween to prevent leakage of well fluid into this region. The shoe 61 is provided with a pair of oppositely disposed vertically extending ears or guides 64 and 66 which are disposed in slots 67 and 68 formed on the interior of the surface of the sleeve 27. The co-operation of the guides 64 and 66 with the slots 67 and 68, respectively, prevents rotation of the shoe 61 with respect to the well tool and therefore with respect to the shaft 44. A spring 69 is disposed between the right surface of body 31, just outwardly of the hub 41, and the plate 52, just inwardly of the flange 53, so as to bias the shoe 61 outwardly from the wall of the well tool 1.

The hollow region between the bellows 34 and 46 is completely sealed so as to exclude drilling muds and may be filled with a suitable electrical insulating and mechanical lubricating fluid so as to assure proper functioning of the apparatus. The region between the bellows 56 and the hub 41 communicates with the interior of the sleeve 31 by means of a plurality of drilled passages 71, only one of which is illustrated in FIGURE 3 of the accompanying drawings. The underlying reason for using the two bellows 34 and 56 is so that the pressure within the sleeve 27 is equal to the pressure within the well. By making the pressure within this region equal to the pressure within the well, the problem of preventing the well fluid from entering the region within the sleeve 27 is greatly reduced. More particularly, since the fluid within the sleeve 27 is at the same pressure as the well fluid, there is no residual force acting upon the seals, tending to unseat them and permit the well fluid to enter the apparatus.

Attached to the end of the arm 44 lying within the hollow cylindrical member 31 is a potentiometer 72, and reference is now made to FIGURE 4 of the accompanying drawings. The potentiometer 72 has a shaft 73 to which the potentiometer wiper (not illustrated) is secured and mounted on the shaft is a gear 74. The casing of the potentiometer is provided with the usual threaded hub 76 surrounding the shaft 73 and a nut 77 which threadedly engages the hub 76. The shaft 73 and hub 76 are disposed in an aperture in the shaft 44 and the nut 77 clamps the shaft between the main body of the potentiometer and the nut. A stationary rack gear 78 has one end secured in a recess in the end wall 39 of the cylindrical member 31 and extends parallel to the shaft 44 and engages the teeth of the gear 74. Therefore, as the shaft 44 reciprocates in response to movement of the shoe 61, the gear 74 and therefore the shaft 73 are rotated so as to produce movement of the potentiometer wiper over a card-type resistor or other suitable resistor disposed in and secured to the potentiometer body.

In order to connect the potentiometer 72 electrically to the electronic circuits contained in the tool 1 a hollow pipe 79 has one end disposed in semi-circular, opposed recesses in the head portion 29 of the cylindrical member 31 and the cap 32. The other end of the pipe 79 projects into the interior of a housing 81 extending outwardly from the well tool 1. The housing 81 is provided with a removable cap 82 generally of the same type as the cap 32. The interior of the pipe 79 communicates at one end with the space defined by the housing 81 and cap 82 and communicates at its other end with the interior of the sleeve 24. Electrical conductors 80, which are connected to the contacts of the potentiometer 72 extend through the pipe 79 and the housing 81 and through a bushing 83 threaded into the wall of the tool 1. The pipe 79 and the space defined by the housing 81 and cap 82 are completely filled with the same liquid material which fills the sleeve 27 so that the entire system is pressure equalized. Since only four small wires must pass through the bushing 83, the problem of maintaining a pressure differential between the pressurized portion of the system including the interior of the pipe 79 etc., and the non-pressurized interior of the well tool 1 is minimized. The diameter of the cable passing through the bushing 83 may be of the order of a sixteenth of an inch and many well known sealing techniques are suitable for maintaining a completely effective fluid tight seal between the two spaces. The wires from the upper sensing mechanism disposed in the aperture 26 may be carried in a pipe 84 to the interior of the sleeve 31 and thence through the pipe 80 into the housing 81 so that both sets of wires may be connected through the bushing 83 into the tool 1.

The sensing mechanisms illustrated in FIGURE 3 are identical in all respects with the exception of the specific shape of the shoes. For example, and reference is now made to FIGURE 5, the shoe 61' which is associated with the upper structure illustrated in FIGURE 3 may be flat and quite broad and specifically may be almost of the same width as the well tool. In consequence, the shoe 61' rides on the mud cake to produce an indication of the location of the outer surface of the mud cake. A shoe 61 which is associated with the lower sensing mechanism as illustrated in FIGURE 3, may be quite sharp and therefore readily penetrates the mud cake and contacts the actual side wall of the well. The difference in resistances between the potentiometers 72 associated with the lower and the upper sensing mechanisms of FIGURE 3 is indicative therefore of the thickness of the mud cake. Further, an additive combination of the readings indicative of the position of the sharp tool and bow spring 2 indicates the true diameter of the well and the reading of the sharp tool alone indicates the roughness and incremental discontinuities in the well wall. The measurements of the thickness of the mud cake and the separation of tool and wall are particularly useful in conjunction with the density logging instrument comprising the radiation source 18 and the radiation detector 23. More particularly, the radiation reflected to or otherwise impinging upon the detector 20 is a function of both the distance of the source and detector from the wall and the density of the material therebetween. The mud or other materials subsisting between the tool and wall are of a different density normally than the strata being measured and therefore introduce unknown factors into the density reading. Unless these factors are taken into consideration interpretation of the log may be difficult. With the knowledge of the thickness of the mud cake and its absorption properties the density log recording may be corrected to reflect the true properties of the strata under investigation. In order to insure maximum accuracy the shoes 61 and 61' are located close to and in line with one another and also are arranged to measure the thickness of the cake in the region of the radiation measurements. Therefore, the combination of instruments as contemplated by the present invention produces a set of well logs from which the density readings may be more intelligently interpreted. Further, the instrument indicates which of the strata posses porosity and permeability; the brittleness of the strata; and the delineations between the various strata, these occurring at regions of marked changes in diameter of the well.

This invention is not limited only to decentralized scattered gamma ray logging but is also useful in other decentralized nuclear logging including activation logging, natural gamma ray logging, neutron-neutron logging and neutron-gamma ray logging. Further, in some instances it may not be possible to place the separation detector between the radiation source and radiation detector. In such cases, the separation detected may be positioned outside this region, but only so long as the separation detector is located such that it will measure the separation from the well wall and/or the thickness of the adjacent mud. Where the radiation source and detector are spaced so far apart that a single separation detector cannot accurately measure the separation of both the radiation source and detector from the well wall and/or the thickness of the adjacent mud, separation detectors may be positioned adjacent both the radiation source and detector. This is particularly true for activation logging, where the spacing between source and detector may be several feet.

I claim:

1. A well logging tool comprising an elongated hollow body, means secured to said body for urging a predetermined part of said body toward a well defining surface, means disposed in said body for effecting nuclear measurements of the subsurface strata adjacent said predetermined part of said body, and means for measuring the thickness of the mud cake formed along said surface adjacent said predetermined part of said body, said last named means comprising a pair of shoes mounted on said body for movement relative thereto, means for urging each of said shoes away from said body in substantially the same direction as said predetermined part is urged, one of said shoes being sharp so as to pierce any mud cake and the other of said shoes being blunt so as to ride on said mud cake and both of said shoes being short relative to said body so as to follow contours bridged by said body, and means for measuring the relative displacement of said shoes.

2. A well logging tool comprising an elongated hollow body, means secured to said body for urging a predetermined part of said body toward a well defining surface, means disposed in said body for effecting nuclear measurements of the subsurface strata adjacent said predetermined part of said body, and means for measuring the separation of said body from said surface adjacent said predetermined part of said body, said last named means comprising a shoe mounted on said body for movement relative thereto, means for urging said shoe away from said body in substantially the same direction as said predetermined part is urged, said shoe being sharp so as to pierce any mud cake and short relative to said body so as to follow contours bridged by said body, and means for measuring the displacement of said shoe relative to said body.

3. A well logging tool comprising an elongated hollow body, means secured to said body for urging a predetermined part of said body toward the mud cake disposed along a well, means disposed in said body for effecting nuclear measurements of the subsurface strata adjacent said predetermined part of said body, and means for measuring the separation of said body from said mud cake adjacent said predetermined part of said body, said last named means comprising a shoe mounted on said body for movement relative thereto, means for urging said shoe away from said body in substantially the same direction as said predetermined part is urged, said shoe being blunt so as to ride on any mud cake and short relative to said body so as to follow contours bridged by said body, and means for measuring the displacement of said shoe relative to said body.

4. A well logging tool comprising an elongated hollow body, means for forcing a predetermined part of said body toward a well defining surface, a source of radiations, said source directing radiations toward said surface adjacent said predetermined part of said body, a radiation detector spaced from said source at such a distance as to receive back-scattered radiations, a first shoe projecting outwardly from said body in the region of said predetermined part and adapted to ride on top of a mud cake encountered thereby, means for mounting said shoe in said body for movement transverse thereto, a second shoe positioned in line along the length of said body with said first shoe and adapted to pierce a mud cake, means for mounting said second shoe in said body for movement transverse with respect thereto, said shoes being disposed between said source and said detector and means for measuring the positions of said shoes relative to said body.

5. A well logging tool comprising an elongated hollow body, means for forcing a predetermined part of said body toward a well defining surface, a radiation source, said source directing radiations toward said surface adjacent said predetermined part of said body, a radiation detector spaced from said source such a distance as to receive back-scattered radiations, a first shoe having a large surface area extending generally parallel to said body and projecting outwardly therefrom in the region of said predetermined part, means for mounting said shoe in said body for movement transverse thereto, a second shoe having a sharp surface extending outwardly from said body and positioned in line with said first shoe along the length of said tool, means for mounting said second shoe in said body for movement transverse thereto, said shoe being disposed betwen said source and said detector, and means for measuring the positions of said shoe relative to said body.

6. A well logging tool comprising an elongated hollow body, means secured to said body for uring a predetermined part of said body toward a well defining surface, means disposed in said body for effecting nuclear measurements of the subsurface strata adjacent said predetermined part of said body, a shoe mounted on said body for movement relative thereto, means for urging said shoe away from said body in substantially the same direction as said predetermined part is urged, said shoe being short relative to said body so as to follow contours bridged by said body, and means for measuring the displacement of said shoe relative to said body.

References Cited by the Examiner
UNITED STATES PATENTS

| | | | |
|---|---|---|---|
| 2,369,672 | 2/1945 | Hare | 250—83.6 |
| 2,471,009 | 5/1949 | Reason | 73—105 |
| 2,725,282 | 11/1955 | Buckley. | |
| 2,725,283 | 11/1955 | Mounce et al. | |
| 2,747,402 | 5/1956 | Doll | 73—152 |
| 2,761,977 | 9/1956 | McKay | 250—83.6 |
| 2,769,918 | 11/1956 | Tittle | 250—71.5 |
| 2,944,148 | 7/1960 | Johnson | 250—71.5 |

RALPH G. NILSON, *Primary Examiner.*